US012800515B2

(12) United States Patent
Shayari et al.

(10) Patent No.: US 12,800,515 B2
(45) Date of Patent: Nov. 17, 2026

(54) SYSTEM AND METHOD FOR DETERMINING PARAMETERS OF PATTERNED STRUCTURES FROM OPTICAL DATA

(71) Applicant: NOVA LTD., Rehovot (IL)

(72) Inventors: Amir Shayari, Rehovot (IL); Gilad Barak, Rehovot (IL)

(73) Assignee: NOVA LTD., Rehovot (IL)

( * ) Notice: Subject to any disclaimer, the term of this patent is extended or adjusted under 35 U.S.C. 154(b) by 141 days.

(21) Appl. No.: 18/845,415

(22) PCT Filed: Mar. 9, 2023

(86) PCT No.: PCT/IL2023/050246

§ 371 (c)(1),
(2) Date: Sep. 9, 2024

(87) PCT Pub. No.: WO2023/170692

PCT Pub. Date: Sep. 14, 2023

(65) Prior Publication Data

US 2025/0067683 A1 Feb. 27, 2025

Related U.S. Application Data

(60) Provisional application No. 63/318,445, filed on Mar. 10, 2022.

(51) Int. Cl.

*G01N 21/956* (2006.01)
*G01B 9/0209* (2022.01)

(Continued)

(52) U.S. Cl.

CPC ..... *G01N 21/95607* (2013.01); *G01B 9/0209* (2013.01); *G01B 9/02091* (2013.01);

(Continued)

(58) Field of Classification Search

CPC ........... G01N 21/956; G01N 21/95607; G01N 21/9501; G01N 21/211; G01N 2021/178;

(Continued)

(56) References Cited

U.S. PATENT DOCUMENTS

2008/0055609 A1* 3/2008 Finarov .................. G01B 11/24 356/625
2008/0180694 A1 7/2008 de Groot (Continued)

*Primary Examiner* — Kara E. Geisel
*Assistant Examiner* — Jonathon Cook
(74) *Attorney, Agent, or Firm* — RECHES PATENTS

(57) ABSTRACT

A control system and method are presented for use in optical measurements on patterned samples. The control system comprises a computer system configured for data communication with a measured data provider and comprising a data processor configured and operable to receive and process raw measured data of first and second types concurrently collected from the patterned sample being measured, said first and second types of the measured data comprising, respectively, scatterometry measured data, characterized by first relatively high signal-to-noise and predetermined first relatively low spatial resolution, and interferometric measured data characterized by second relatively low signal-to-noise and predetermined second relatively high spatial resolution, said data processor being configured to process the measured data to determine pattern parameters along said patterned sample characterized by said first signal to-noise and said second spatial resolution.

10 Claims, 8 Drawing Sheets

(51) Int. Cl.
*G01B 9/02091* (2022.01)
*G01N 21/17* (2006.01)
*G01N 21/45* (2006.01)
*G01N 21/95* (2006.01)

(52) U.S. Cl.
CPC ......... *G01N 21/45* (2013.01); *G01N 21/9501* (2013.01); *G01N 2021/1755* (2013.01); *G01N 2021/178* (2013.01)

(58) Field of Classification Search
CPC ... G01N 2021/1755; G01N 2021/4704; G01N 2021/4711; G01N 2021/213; H10P 74/00; H10P 74/20; H10P 74/203; G01B 9/02029; G01B 9/022084; G01B 9/0209; G01B 9/02091
See application file for complete search history.

(56) References Cited

U.S. PATENT DOCUMENTS

| | | | | |
|---|---|---|---|---|
| 2008/0266547 | A1 | 10/2008 | Clark et al. | |
| 2010/0091284 | A1 | 4/2010 | Mieher | |
| 2017/0016835 | A1* | 1/2017 | Barak | G01B 9/0209 |
| 2018/0112968 | A1* | 4/2018 | Chen | G01B 11/02 |
| 2018/0156597 | A1* | 6/2018 | Smith | G01B 9/02043 |
| 2020/0088656 | A1 | 3/2020 | Pois et al. | |
| 2020/0170501 | A1 | 6/2020 | Frisken et al. | |
| 2020/0243400 | A1* | 7/2020 | Wang | H10P 74/203 |
| 2020/0357704 | A1* | 11/2020 | Schaefer | G01B 11/0675 |
| 2022/0316856 | A1* | 10/2022 | Chen | G01B 9/02092 |
| 2024/0011921 | A1* | 1/2024 | Zuvela | G01N 21/9501 |

* cited by examiner

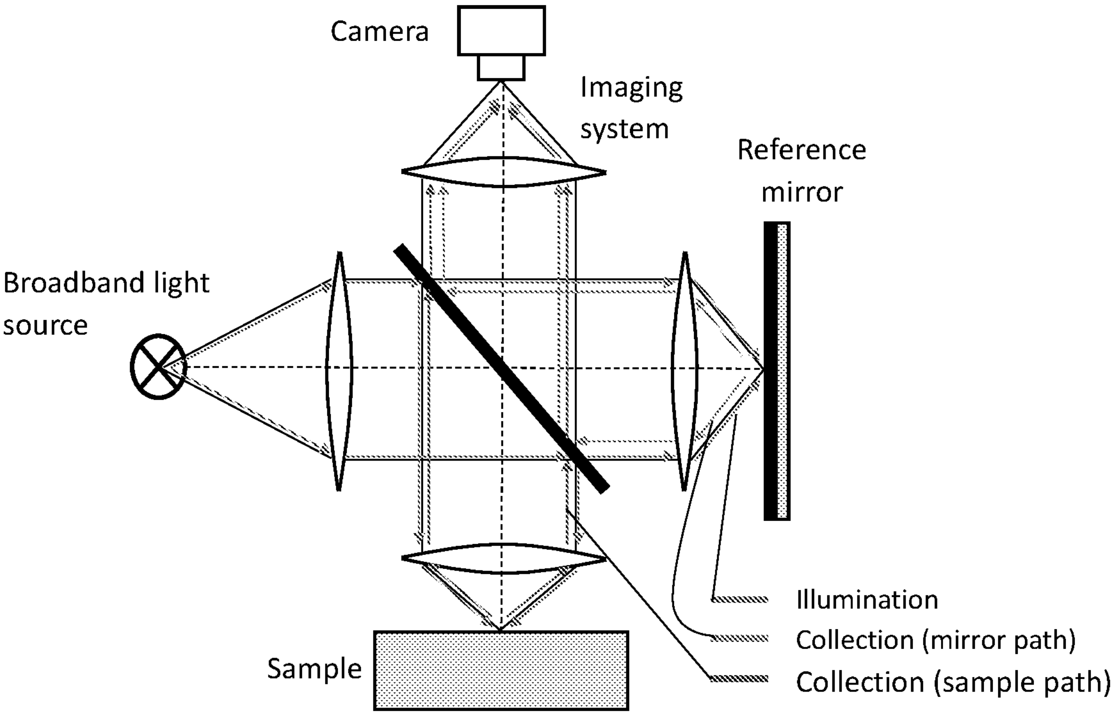
FIG. 1 (General Art)

SYSTEM AND METHOD FOR DETERMINING PARAMETERS OF PATTERNED STRUCTURES FROM OPTICAL DATA

TECHNOLOGICAL FIELD AND BACKGROUND

The present disclosure is generally in the field of optical measurement techniques and relates to a system and method for determining parameters of patterned samples, particularly useful in semiconductor industry for automatic measurements on semiconductor wafers.

Modern semiconductor technology requires patterned structure with very small features, i.e., nanoscale features. Keeping in mind that manufacturing of semiconductor devices typically utilizes automatic measurements and inspection of the structures being manufactured while progressing on a production line, automatic measurement and inspection techniques should be capable of operating with correspondingly high resolution and high signal-to-noise characteristics.

Optical critical dimension (OCD) metrology is considered as a highly suitable technique in semiconductor manufacturing process, due to its extreme sensitivity, accuracy, flexibility and speed. The structural parameters of a patterned sample typically measured by OCD include critical dimensions, heights, side wall angles, thicknesses, material properties, etc.

OCD is based on the use of scatterometric data (also referred to herein as "spectra data"), which is typically acquired as reflected light radiation that is indicative of properties of patterns at wafer sites. Optical models are commonly applied in OCD metrology to determine whether patterns at wafer sites are being fabricated with correct specifications. Hereinbelow, the more general term "OCD model" refers both to physical models developed from principles of optics and to machine learning models known in the art.

A semiconductor wafer holds multiple 'dies', each of these eventually intended to become a functioning chip. Measurements are often taken at dedicated regions between the dies called "test sites". It is strongly preferred to perform metrology on sites within the die, guaranteeing best correlation between the metrology results and the characteristics of the functional structures inside the die. However, the die design is typically such that no homogeneous regions large enough for the optical metrology to measure exist, preventing such metrology.

Exemplary scatterometric tools for measuring (acquiring) scatterometric data (e.g., spectrograms) may include spectral ellipsometers (SE), spectral reflectometers (SR), polarized spectral reflectometers, as well as other optical critical dimension (OCD) metrology tools. Such tools are incorporated into OCD metrology systems currently available. One such OCD metrology system is the NOVA T600® Advanced OCD Metrology tool, commercially available from Nova Measuring Instruments Ltd. of Rehovot, Israel, which takes measurements of pattern parameters that may be at designated wafer sites, that is, "in-die." Additional methods for measuring critical dimensions (CDs) could include interferometry, X-ray Raman spectrometry (XRS), X-ray diffraction (XRD), and pump-probe tools, among others. Some examples of such tools are disclosed in U.S. Pat. Nos. 10,161,885, 10,054,423, 9,184,102, and 10,119,925, and in international pending patent application published as WO2018/211505, all assigned to the assignee of the present application and incorporated herein by reference in their entirety.

Extraction of various information about a patterned sample can utilize detection and analysis of spectral phase of light scattered from the sample, i.e. the relative phase between incident and reflected electromagnetic waves which is typically different for different wavelengths, incident angles/azimuths and polarizations. The spectral phase can be measured using interference effects. One method of measuring the spectral phase utilizes so-called white light interferometry (WLI) which can be advantageously used for surface height measurement on 3D structures with surface profiles varying between nanometers and a few centimeters.

WO 2015/155779, assigned to the assignee of the present application, describes a phase measurement technique. According to this technique, the measurement system includes a broadband light source, an interferometric system and a detection unit, and provides measured data indicative of the reflected spectral amplitude and phase. This measured data undergoes model-based processing enabling determination of parameters of the pattern in the sample.

GENERAL DESCRIPTION

There is a need in the art for a novel approach for optical measurements in patterned samples enabling high-resolution and high signal-to-noise measurements of various pattern parameters in the sample. Specifically, considering such patterned samples as semiconductor wafers, there is a need for measuring small regions located within the functional die, whereas current optical metrology (OCD metrology) solutions are limited in their ability to accomplish such measurements due to their too large measurement spot ("few dozens" or "several tens" microns). On the other hand, white light interferometry (WLI) cannot be used for optical metrology because the measured quality of WLI is not sufficient to allow interpretation of the underlying structure characteristics.

The technique of the present disclosure provides effective combined OCD and WLI measurements thus extracting the pattern parameters with high spatial resolution and spatial sampling (that of WLI technique) and high signal quality (that of OCD technique).

It should be noted that the quality of measurements is generally defined by various factors including signal-to-noise (SND), wavelength resolution, calibration accuracy, etc. Since relatively low SNR of WLI (compared to that of OCD) is the most critical drawback of WLI, the relatively low measured signal quality of WLI is referred to as "relatively low SNR" as compared to "relatively high SNR of OCD".

A typical setup for white-light interferometry is schematically illustrated in FIG. 1. In this setup, a Michelson interferometer utilizes a broadband light source and a camera is used as a detector at the output of the interferometer. A measured sample is placed in one arm of the interferometer and a reference mirror on the other arm. Both sample and mirror are imaged through the collection optics onto the camera. During measurement, either the reference mirror or sample are moved in the longitudinal direction (z). Light reflected from the sample surface and the reference mirror is superimposed at the detector and interferes there. Each pixel on the camera acquires a full interferogram (reflectivity vs. mirror position z), jointly comprising the white light image.

Key error sources in white-light interferometry are the random arrival of photons at the detector ('Poisson' or 'shot' noise), the variation of the mirror motion speed (positioning noise), mirror orientation, and the discretization of the measured analog signal (discretization noise). The shot noise caused by the random arrival of photons at the detector is unique among the noise sources mentioned here. As a fundamental property of the quantum nature of light, the shot noise cannot be reduced. The shot noise imposes a basic limit on the maximal signal-to-noise ratio (SNR) that can be achieved with WLI technique.

WLI provides a signal that often has too low signal-to-noise ratio, such that it may be insufficient for measurements on high-end semiconductor structures. In particular, WLI cannot by itself successfully solve an application (i.e., provide dimensional and material parameters) of patterned structure(s) as offered by modern OCD solutions (e.g., scatterometry, etc.).

On the other hand, WLI utilizes a pixel matrix for light detection and thus can provide a relatively high spatial resolution of measurements, as compared to that of OCD, in addition to its ability to provide parallel characterization of multiple locations on the imaged region.

The present disclosure provides a novel technique, overcoming the resolution and signal quality/signal-to-noise challenges by properly combining OCD and WLI measurement techniques such that the resulting solution is better than the solution that can be provided by each one of the techniques on its own. The inventors have found that by performing OCD measurements (using a standard OCD technique) on dedicated pads/spots of a sample and solving the application parameters (using model-based processing and fitting technique), performing WLI measurements on the same spots (and preferably concurrently with the OCD measurements) and obtaining a noisier spectrum than with the standard OCD, better final results (accurate measurements of pattern parameters) can be obtained. This is achieved by using the OCD solution to optimize the application's parameters and obtain a nominal solution at the measured site and using the WLI signal to extract high spatial resolution map of the parameter distribution within the measured region by using the differences between the WLI data and the OCD channel.

Thus, according to one broad aspect of the present disclosure, it provides a control system for use in optical measurements on patterned samples, the control system comprising a computer system configured for data communication with a measured data provider and comprising a data processor configured and operable to receive and process raw measured data of first and second types concurrently collected from the patterned sample being measured, said first and second types of the measured data comprising, respectively, scatterometry measured data, characterized by first relatively high signal-to-noise and predetermined first relatively low spatial resolution, and interferometric measured data characterized by second relatively low signal-to-noise and predetermined second relatively high spatial resolution, said data processor being configured to process the measured data to determine pattern parameters along said patterned sample characterized by said first signal to-noise and said second spatial resolution.

In some embodiments, the data processor comprises: a data processing utility configured and operable to process the scatterometry measured data utilizing at least one of model-based or machine learning processing of said scatterometry measured data and extract an average value of at least one pattern parameter of the sample for each measured spot on the sample (e.g. from a theoretical spectrum corresponding to a best fit condition with the scatterometry measured data); an optimizer utility configured and operable to process the interferometric measured data to transform each pixel-related interferogram of the interferometric measured data into a pixel-related spectrum, and utilize the scatterometry measured data (e.g. of said best fit condition) to extract, from said each pixel-related spectrum, a spectral part matching the scatterometry data, and generate respective first and second matching spectra; and a spectral analyzer utility configured and operable to analyze the first and second matching spectra and extract, from a spectral difference between the first and second matching spectra, distribution of pixel-related measured values of said at least one parameter in a pixel matrix of a size of the measured spot, and generate output data indicative of said distribution.

The output data may be in the form of a map of the parameter's values for each of said at least one parameter.

According to another broad aspect of the present disclosure, there is provided a system for measuring parameters of patterned samples comprising:

- a measurement system configured to concurrently perform scatterometric measurements and spectral interferometric measurements on each measured spot on the sample, the measurement system comprising: a broadband light source generating light propagating along an illumination channel towards the measured spot, an interferometric assembly, and a detection system comprising a spectrometer and a pixelated detector generating, respectively, first type measured data and second type measured data concurrently collected from the measured spot on the sample, being scatterometry measured data characterized by first relatively high signal-to-noise and first relatively low spatial resolution, and interferometric measured data characterized by second relatively low signal-to-noise and second relatively high spatial resolution; and
- the above-described control system.

The measurement system may be configured and operable to selectively activate the interferometric assembly to collect said second type measured data and disactivate the interferometric assembly to collect the scatterometric measured data.

The present disclosure also provides a data analysis method for use in optical measurements on patterned samples to determine at least one pattern parameter of interest, the method comprising:

- providing raw measured data of first and second types concurrently collected from the patterned sample being measured, said first and second types of the measured data comprising, respectively, scatterometry measured data characterized by first relatively high signal-to-noise and first relatively low spatial resolution, and interferometric measured data characterized by second relatively low signal-to-noise and second relatively high spatial resolution,
- processing said first and second types of the measured data to determine each of said at least one parameter of interest with said first signal to-noise and said second spatial resolution.

The processing of the measured data may be as follows:

- applying at least one of model-based and machine learning processing to the scatterometry measured data to extract an average value of at least one pattern parameter of the sample for each measured spot on the sample;
- processing the interferometric measured data to transform each pixel-related interferogram of the interferometric measured data into a pixel-related spectrum, utilizing the scatterometry measured data to extract, from said each pixel-related spectrum, a spectral part matching the scatterometry data, and generating respective first and second matching spectra; and analyzing the first and second matching spectra and extracting from a spectral difference between the first and second matching spectra, distribution of pixel-related measured values of said at least one parameter in a pixel matrix of a size of the measured spot and generating output data indicative of said distribution.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1 is a general art WLI setup;

DETAILED DESCRIPTION OF EMBODIMENTS

FIG. 1 illustrates a typical WLI measurement scheme, which can be used as part of a measurement system suitable to provide WLI measured data.

Figure 2A:
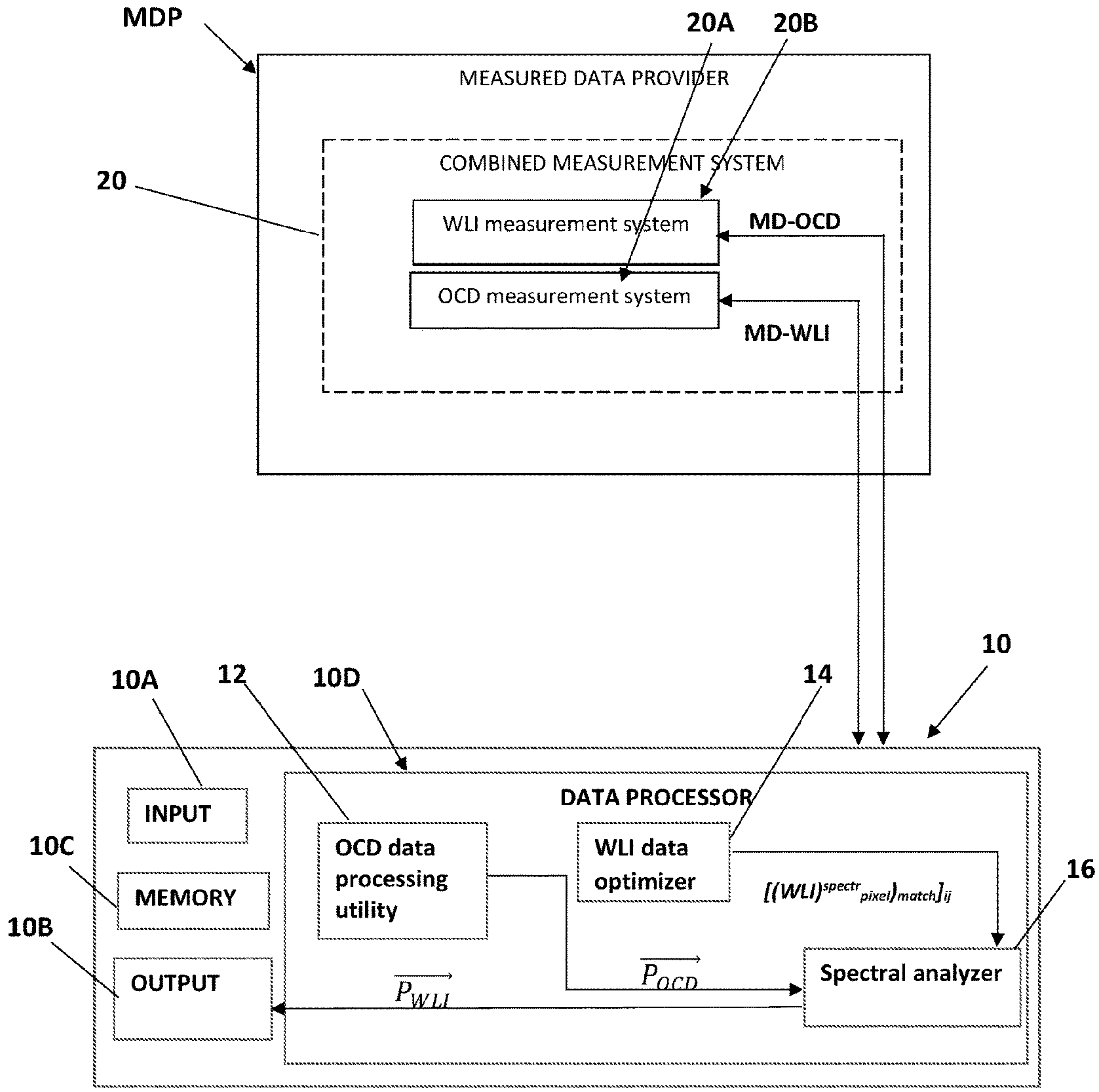
FIG. 2A illustrates the configuration and operation of a control system according to the present disclosure for processing combined optical data measured data collected from a sample by a combined OCD and WLI measurement system.

Reference is made to FIG. 2A illustrating a control system 10 of the present disclosure for processing combined measured data CMD including OCD measured data MD-OCD and WLI measured data MD-WLI. The combined measured data is obtained from a measured data provider MDP, which may be a combined measurement system 20 performing such combined/hybrid measurements on a sample (on-line operational mode of the control system 10) or a storage device in which the previously collected combined measured data is kept (off-line operational mode of the control system 10). It should be noted that the control system 10 may for example be integral with the measurement system 20.

The measurement system 20 is preferably configured to concurrently perform OCD and WLI measurements applied to the same measurement sites (spots) on a sample, and includes an OCD measurement system 20A and an WLI measurements system 20B. The OCD and WLI measurement systems 20A and 20B concurrently perform respective first and second types measurements and provide first type measured data being scatterometry measured data MD-OCD and second type measured data being interferometric measured data MD-WLI. The scatterometry measured data is characterized by first relatively high signal-to-noise (quality) and predetermined first relatively low spatial resolution, and the interferometric measured data is characterized by second relatively low signal-to-noise (quality) and second relatively high spatial resolution.

The control system 10 is configured as a computer system including inter alia such main functional utilities as data input utility 10A, data output utility 10B, memory 10C and data processor 10D. It should be understood that the control system 10 is in data communication with the measured data provider 20 using any known suitable communication techniques, e.g., wireless communication of any known suitable type and communication protocols. These communication techniques are known per se and do not form part of the present invention and therefore need not be described.

The data processor 10D is configured and operable according to the present disclosure to process the combined measured data and extract values of one or more pattern parameters along the patterned sample characterized by the relatively high quality/signal to-noise (that of the OCD measurements) and relatively high spatial resolution (that of the WLI measurements).

The data processor 10D includes an OCD data processing utility 12 which is configured and operable to obtain the average sample characteristics. This can be implemented using model-based processing and/or machine learning techniques. In the description below, the model-based (fitting based) technique is exemplified, but it should be understood that the technique of the present disclosure is not limited to such model-based data processing.

Further provided in the data processor is an WLI data optimizer 14 configured and operable to extract from the WLI measured data a spectral part/signature $[(\mathrm{WLI})^{spect}{}_{pixel})_{match}]_{ij}$ matching the OCD spectrum, and a spectral analyzer 16 configured and operable to find, for each pixel of the pixelated detector of the WLI measurement system, a spectral difference between the spectrum extracted from the WLI measured data at that pixel and the OCD spectrum, and using this spectral difference to determine the parameter difference from the average parameter (as obtained from the OCD). Specific examples of the data processing technique will be described further below.

Figure 2B:
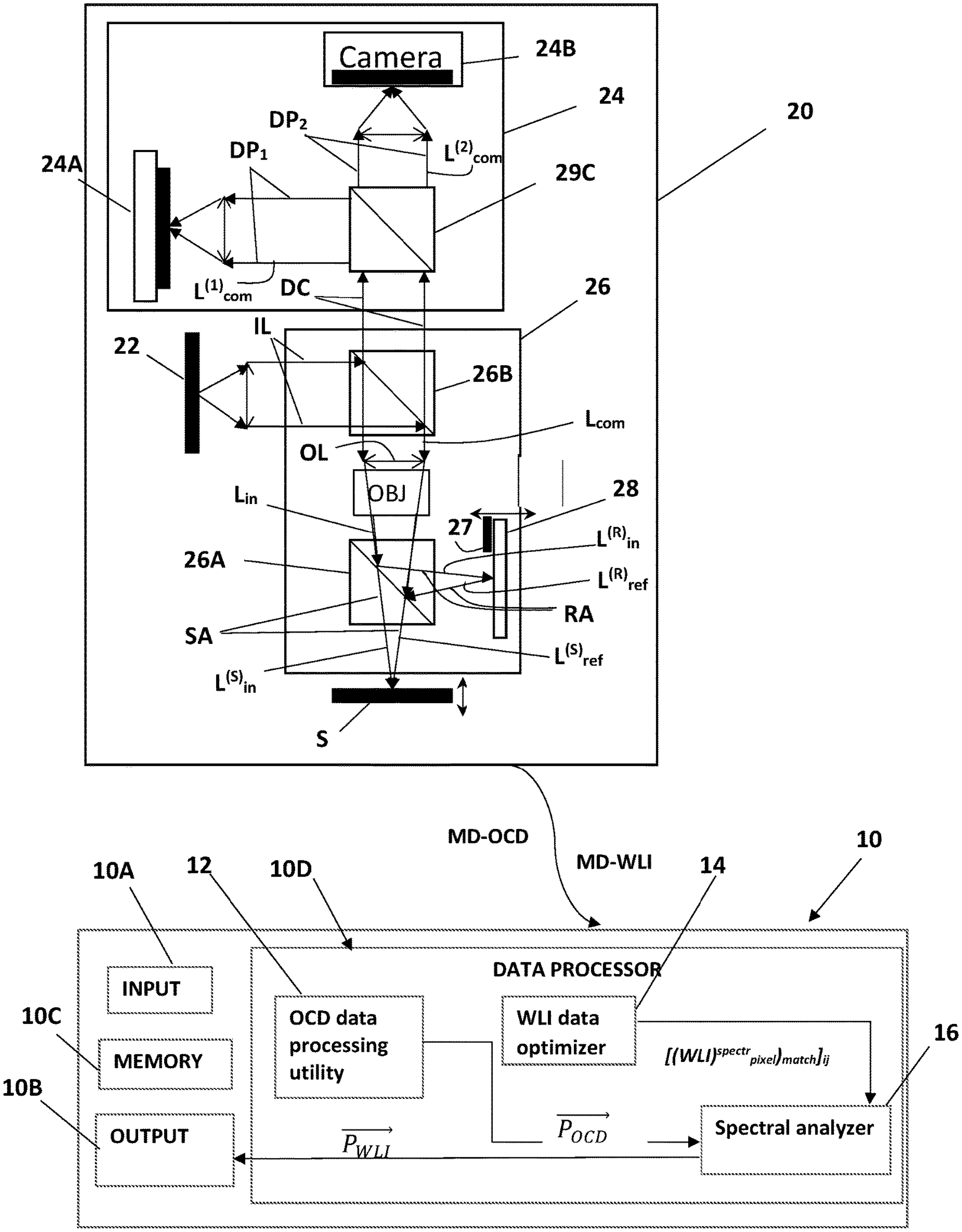
FIGS. 2B and 2C illustrate two examples of the combined measurement system suitable to be used in the technique of the present disclosure.
Figure 2C:
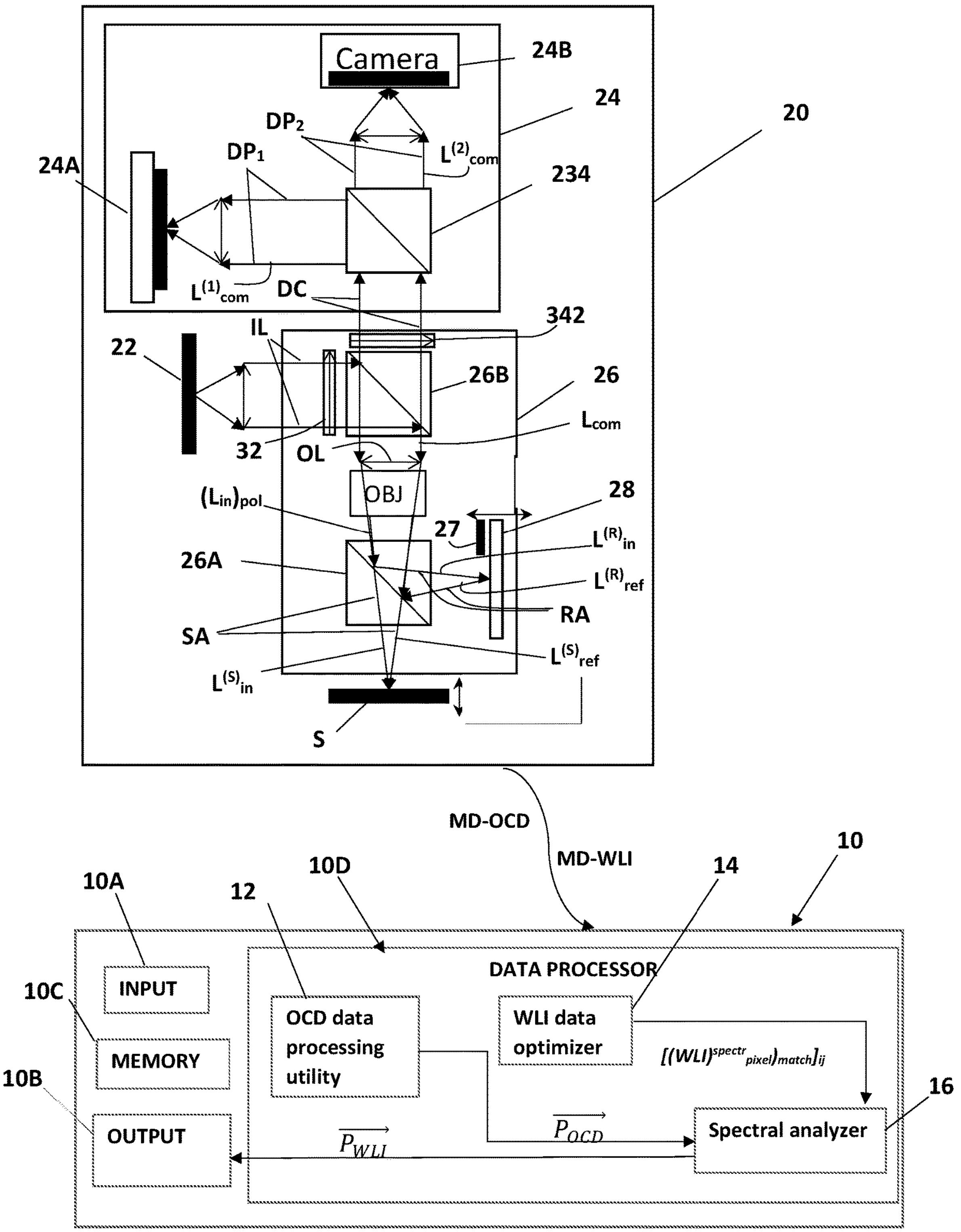

FIGS. 2B and 2C show two specific not-limiting examples of the possible configurations of the combined measurement system. To facilitate understanding, the same reference numbers are used to identify the components common in all the examples. As shown in these examples, the system 20 includes a broadband light source producing input light propagating along an illumination channel IL towards a sample S to be measured, a detection system 24 including an OCD detector 24A (spectrometer) and a pixelated detector (CCD) 24B, and an interferometric assembly 26. It should be noted that two different light sources could be used—one optimized for OCD and another for WLI measurements. The interferometric assembly 26 includes a beam splitter/combiner 26A which splits the illumination channel IL into a sample arm SA where the sample S is and a reference arm RA where a movable reflector 28 is located and combines light returned from the sample and reflector to propagate towards a detection channel DC. Also provided in the system 20 is a beam splitter/combiner 26B located in the illumination and detection channels to direct incident light into the interferometric assembly and direct the combined light towards the detection system 24, and a beam splitter 26C which splits the detection channel into OCD detection path $DP_1$ and camera detection path $DP_2$. The system 20 may also include lenses (e.g., objective lens OL) as well as other light directing element(s).

Thus, input light $L_{in}$ from the light source 22 is reflected by beam splitter/combiner 26B towards the interferometric assembly (e.g., via objective lens OL) and is then split by beam splitter/combiner 26A into sample incident component $L^{(S)}_{in}$ impinging onto an illumination spot on the sample and reference incident component $L^{(R)}_{in}$ interacting with the reflector 28. Corresponding sample and reference reflected components, $L^{(S)}_{ref}$ and $L^{(R)}_{ref}$, are combined by the beam splitter/combiner 26A into a combined light beam $L_{com}$ to propagate to the beam splitter/combiner 26B which directs the combined light beam $L_{com}$ towards the beam splitter/combiner 26C which splits this combined light beam into first and second light components $L^{(1)}_{com}$ and $L^{(2)}_{com}$ propagating along the detection paths $DP_1$ and $DP_2$ to the OCD detector 24A and camera 24B. These detectors 24A and 24B generate corresponding types of measured data MD-OCD and MD-WLI forming together combined measured data to be processed by the control system 10.

It should be noted that collection of the WLI measured data requires collection of the combined light (from the sample and reference arms) and optical path difference OPD data while moving the reflector 28, while collection of OCD could not to operate with interference effect. Accordingly, the system 20 may include a shutter 27 located in front of the reflector 28 and shiftable between its open and closed states to, respectively, activate and disactivate the reference arm; or alternatively, the system operates to collect the OCD data in the time slots during which the reflector is outside the reference arm (or disregard the OCD data collected during the time intervals of reflector being active in the reference arm).

The OCD measured data portion MD-OCD generated by detector 24A is in the form of spectrum collected from the entire illuminated spot and thus has relatively low spatial resolution defined by the spot size. The WLI measured data portion MD-WLI generated by the detector 24B with respect to the same measurement session (i.e., for the same illumination spot) is interferometric data in the form of a matrix of interferograms (interferogram per camera pixel). Such data is actually in the form of pixels' gray scale collected during the reflector's movement e.g., ~30μ@15 sec) and is thus relatively noisy but characterized by higher spatial resolution (pixel size resolution) as compared to the OCD measured data. This combined measured data is received and processed by the control system 10, as will be described further below.

The measurement system may utilize polarizers. This is illustrated in the example of FIG. 2C.

It should be noted that in these specific but not limiting examples, the measurement system is exemplified as being configured for operation with the normal incidence mode and bright field measurement mode. It should, however, be understood that the invention is not limited to this configuration, and generally, measurement can be obtained in any (oblique or other) angle-of-incidence mode, as well as can utilize dark-field measurement mode or a combination of bright- and dark-field measurement modes.

Considering the normal incidence and bright-field detection modes exemplified herein, the beam splitter/combiners units 26A and 26B are located in both the illumination and detection channels. The light directing optics may optionally include a collimating lens in the illumination channel, being in the optical path of the input light, and/or a tube lens in the detection channel being in the optical path of collected light propagating to the detection system.

As exemplified in FIG. 2C the combined measurement system 20 is generally similar to the system of FIG. 2B but further includes polarizers 32 and 34 located, respectively, in illumination (IL) and detection (DC) channels. More specifically, input light $L_{in}$ on its way from the light source 22 passes through the polarizer 32 and a specifically polarized (e.g., linearly polarized) input light $(L_{in})_{pol}$ is directed by beam splitter/combiner 26B towards beam splitter/combiner 26A (e.g. via objective lens OL) and is then split by beam splitter/combiner 26A into sample incident component $L^{(S)}_{in}$ impinging onto an illumination spot on the sample and reference incident component $L^{(R)}_{in}$ interacting with the reflector 28. Corresponding sample and reference reflected components, $L^{(S)}_{ref}$ and $L^{(R)}_{ref}$, are combined by the beam splitter/combiner 26A into a combined light beam $L_{com}$ having said specific polarization, which passes through the objective OL and beam splitter/combiner 26B to the polarizer 34 which allows only light of said specific polarization to propagate to the detection system 24, specifically to the beam splitter/combiner 26C. This beam splitter/combiner 26C splits this combined light beam $L_{com}$ having said specific polarization into first and second light components $L^{(1)}_{com}$ and $L^{(2)}_{com}$ propagating along the detection paths $DP_1$ and $DP_2$ to the OCD detector 24A and camera 24B. These detectors 24A and 24B generate corresponding types of measured data MD-OCD and MD-WLI forming together combined measured data to be processed by the control system 10. It should be understood that using polarizers 32 and 34 accommodated and oriented as described above actually provides a cross-polarization scheme, which results in the dark-field measurement mode. It should also be understood that when the mirror 28 is not used (i.e., is moved out of the optical path of incident light or is inactivated by the use of an appropriate shutter, e.g., shutter 27), the system 30 can operate as a spectral reflectometer. Accordingly, the same system 30 may be shifted between two different operational modes, as a spectral interferometer and spectral reflectometer.

Figure 2D:
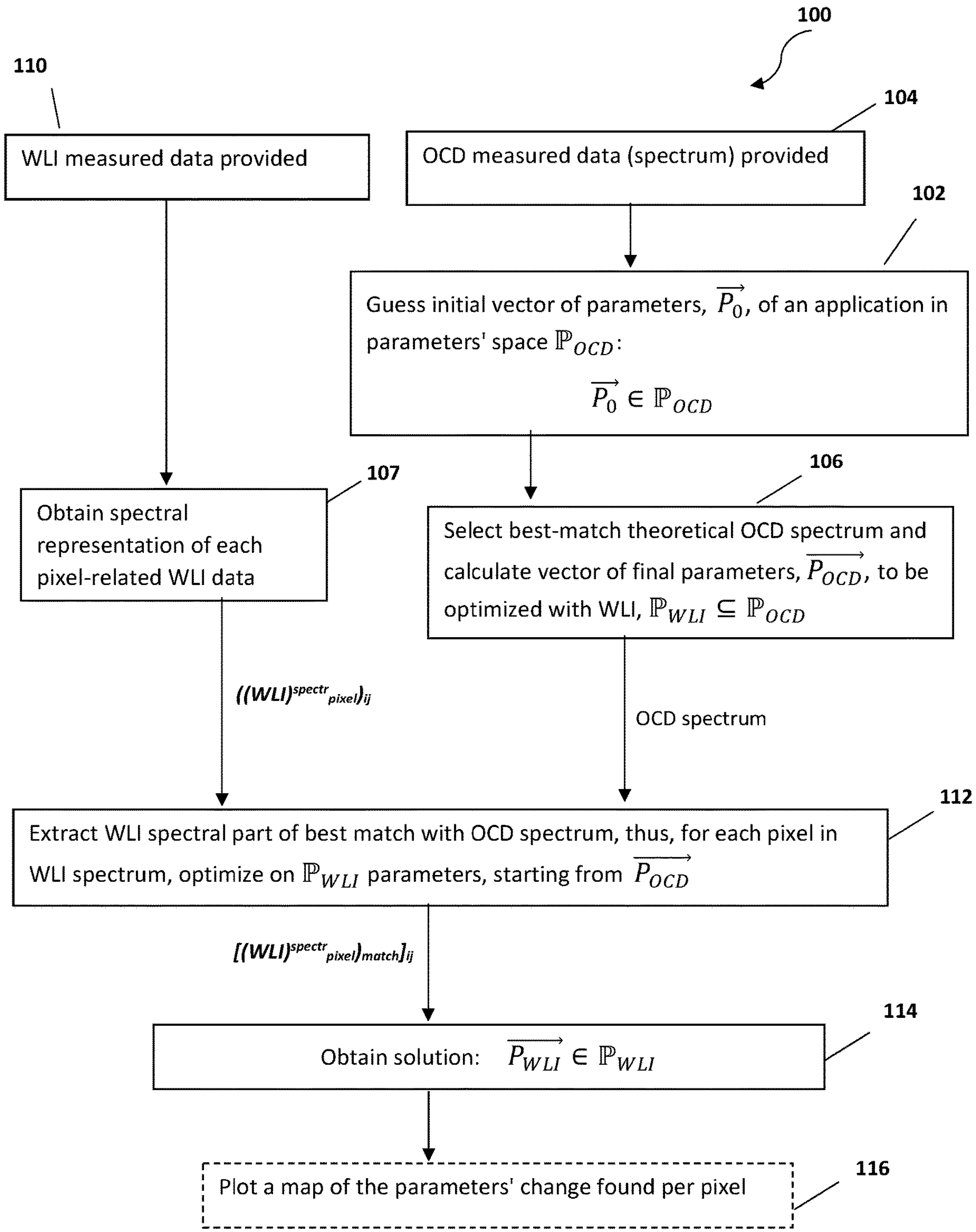
FIGS. 2D and 2E illustrate flow diagrams of two examples of the operational steps of the control system according to the present disclosure.

FIG. 2D exemplifies a flow diagram 100 of the operational steps of the data processor 10D.

The data processor 10D includes an OCD data processing utility 12 configured to e.g. utilize one or more models for interpreting OCD measured data MD-OCD and extract one or more parameters of the sample (average parameter value for the measurement spot), e.g. from the theoretical (modeled) OCD spectrum corresponding to the best fit condition with the measured OCD spectrum MD-OCD. Any patterned structure (an application) to be measured in order to determine its dimensional and material parameters (i.e., to solve the application) defines a parameter space $\mathbb{P}_{OCD}$ which may contain e.g., the values of TCD (top critical dimension), BCD (bottom critical dimension), SWA (sidewall angle), etc. Thus, initial vector of parameters, $\vec{P_0}$, of an application (per site on wafer) in parameters' space $\mathbb{P}_{OCD}$ is guessed: $\vec{P_0} \in \mathbb{P}_{OCD}$ (step 102). Due to the low SNR (signal-to-noise ratio) of the WLI technique, it cannot find the correct parameter values' vector from a general guess of $\vec{P_0} \in \mathbb{P}_{OCD}$, however the standard OCD technique can solve the application and find $\overrightarrow{P_{OCD}}$, although with limited resolution. Therefore, in step 104, the OCD measured data (spectrum)

is received being measured with OCD standard technique, e.g., scatterometry, and then using typical model-based processing best-match theoretical OCD spectrum is selected and vector of final parameters, $\overrightarrow{P_{OCD}}$, is calculated in step 106. It should be understood that these are parameters that are to be optimized with WLI. $\mathbb{P}_{WLI} \subseteq \mathbb{P}_{OCD}$. This vector of parameters is much closer to the real solution than $\overrightarrow{P_0}$, though may have e.g., a limited resolution, hence the WLI can be used to optimize it.

Figure 3A:
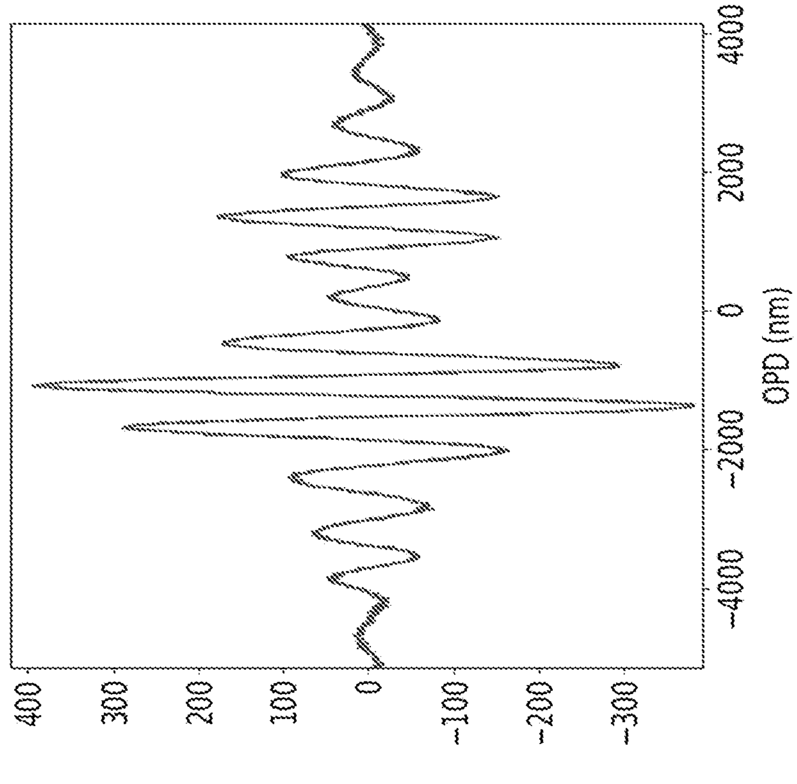
FIGS. 3A and 3B exemplify one of the data processing steps aimed at extracting spectral data from the WLI raw measured data.

The WLI measured data is provided/received at the data processor (step 110), which as indicated above is preferably measured concurrently with the OCD data using the common optical scheme. As shown in FIG. 3A, such WLI measured data is in the form of interferogram for each camera pixel.

Figure 3B:
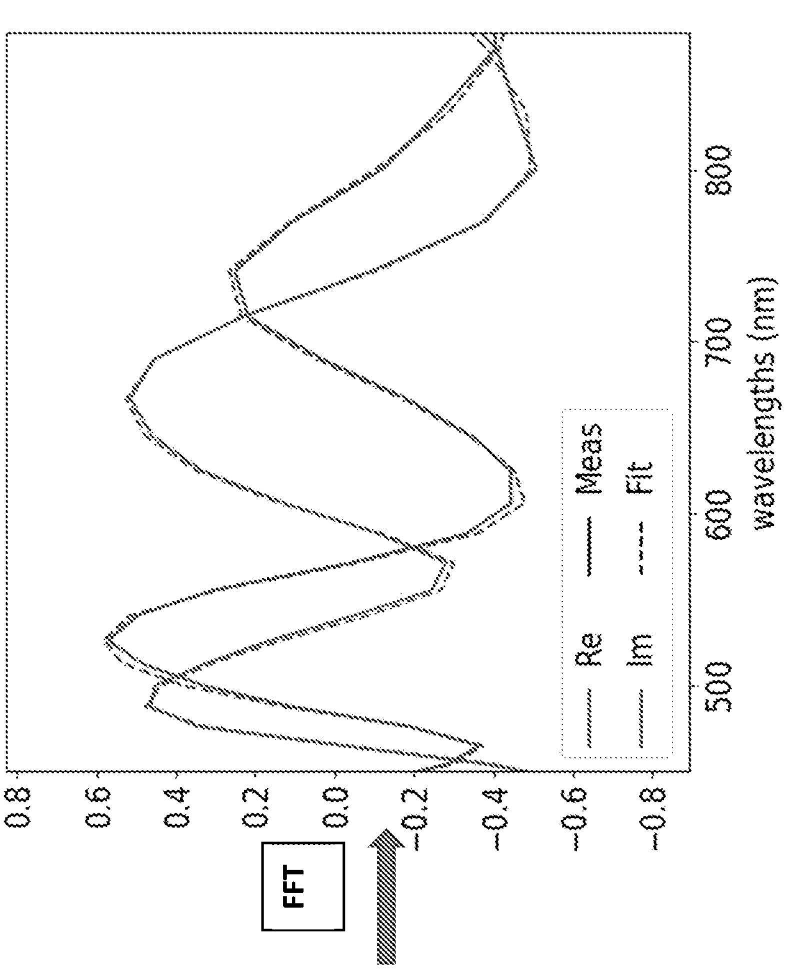
Figure 4:
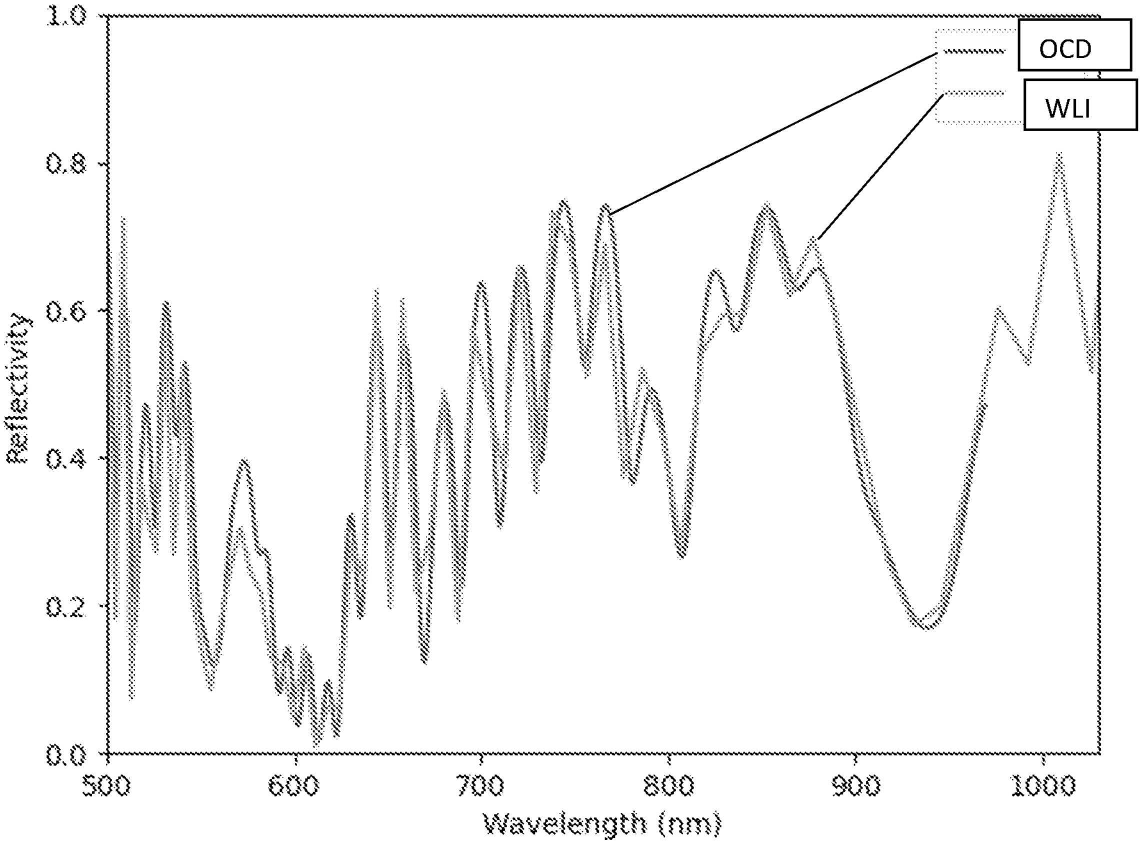
FIG. 4 exemplifies the spectral analysis step of the data processing (spectral matching step between the OCD and WLI data)

The data processor 10D includes the WLI data optimizer 14, which is configured and operable to apply Fourier transform processing to each ij-th pixel-related interferogram $((\text{MD-WLI})_{pixel})_{ij}$ (FIG. 3A) in the pixel matrix of the detector 24B to transform it to spectral data $((\text{WLI})^{spectr}{}_{pixel})_{ij}$ (step 107) as exemplified in FIG. 3B. The optimizer further operates to utilize the OCD spectral data to extract, from the WLI pixel-related spectral data $((\text{WLI})^{spectr}{}_{pixel})_{ij}$, a spectral part/signature $[(\text{WLI})^{spectr}{}_{pixel})_{match}]_{ij}$ satisfying a best match with the OCD spectrum and thus optimize the WLI data on $\mathbb{P}_{WLI}$ parameters, starting from $\overrightarrow{P_{OCD}}$ (step 112). This is exemplified in FIG. 4. Keeping in mind that the OCD spectrum corresponding to best fit condition with the theoretical OCD data describes the parameter values' distribution with high accuracy but low spatial resolution, the corresponding matching WLI spectral data relates to the same pattern parameter(s) but with higher spatial resolution.

Further provided in the data processor 10D is the spectral analyzer utility 16, which compares between the OCD spectrum and its matching WLI spectral part to determine the spectral difference between the two spectra and extract therefrom the corresponding parameter values difference (for each parameter) at the pixel resolution within the illuminated spot (step 114). To this end, the spectral analyzer 16 utilizes a known correlation between the OCD spectral variation and the corresponding parameter variation. The output data may be in the form of a map of the parameters' change found per pixel (or number of pixels) (step 116).

Figure 2E:
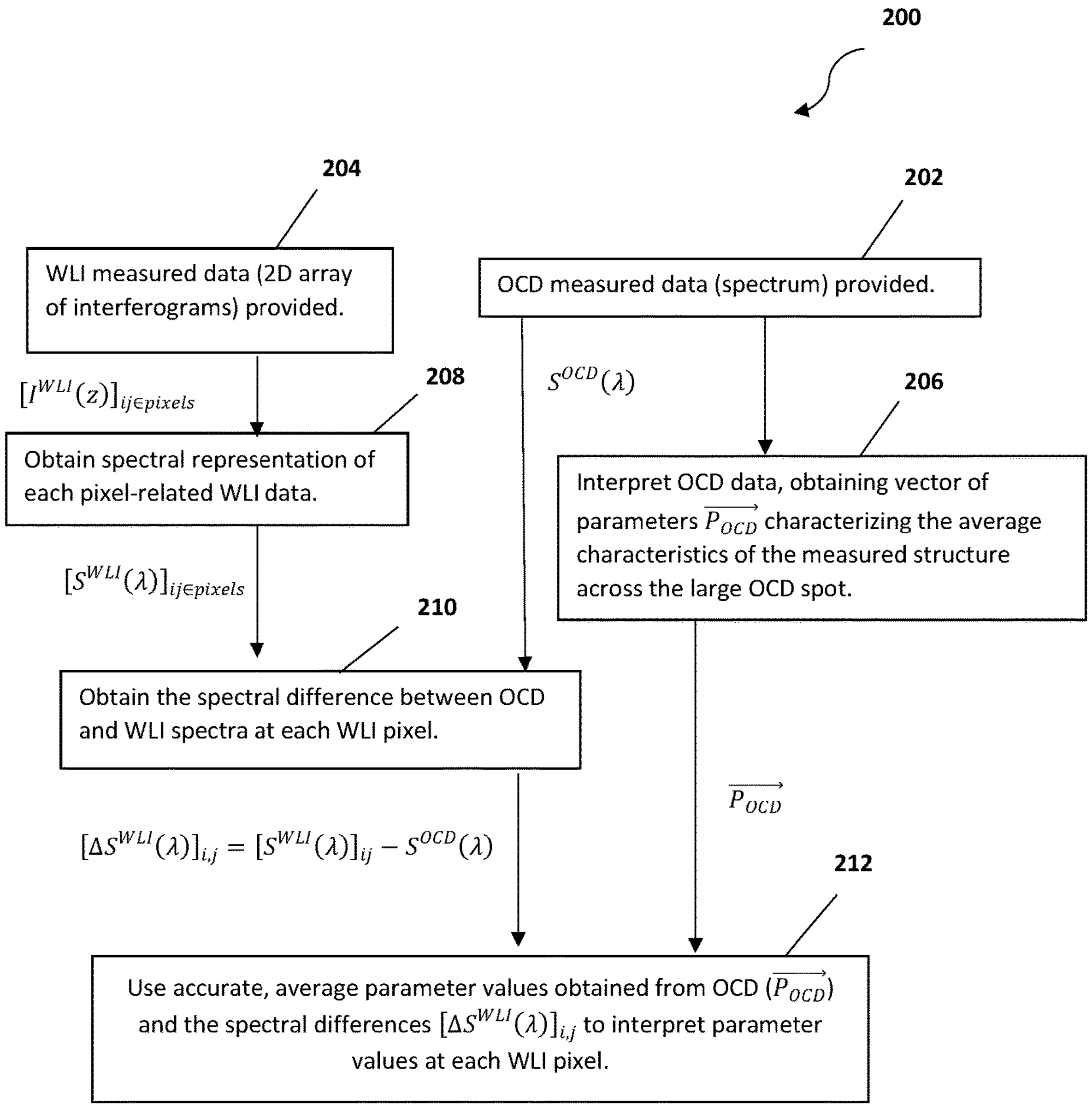

Reference is made to FIG. 2E exemplifying by way of a flow diagram 200 the operational steps of the control system according to another embodiment of the present disclosure. The OCD measured data in a form of a spectrum $S^{OCD}(\lambda)$ is provided (step 202), being measured with OCD standard technique, e.g., scatterometry. The OCD measured data is interpreted in step 206, obtaining vector of parameters $\overrightarrow{P_{OCD}}$ characterizing the average characteristics of the measured structure across the relatively large OCD spot ("few dozens" or "several tens" microns). The WLI measured data is provided (step 204) in a form of interferograms $[I^{WLI}(z)]_{ij \in pixels}$, one for each pixel ij in the pixel matrix of the detector 24B. The spectral representation $[S^{WLI}(\lambda)]_{ij \in pixels}$ of each pixel-related WLI data is obtained in step 208 (e.g., by applying Fourier transform processing to each ij-th pixel-related interferogram). In the next step (210) the spectral difference $[\Delta S^{WLI}(\lambda)]_{i,j}$ between OCD and WLI spectra at each WLI pixel is obtained $([\Delta S^{WLI}(\lambda)]_{i,j} = [S^{WLI}(\lambda)]_{ij} - S^{OCD}(\lambda)$. In the last step (212) accurate, average parameter values obtained from OCD ($\overrightarrow{P_{OCD}}$ obtained in step 206) and the spectral differences $[\Delta S^{WLI}(\lambda)]_{i,j}$ are used to interpret parameter values at each WLI pixel, thereby increasing measurement resolution while keeping high accuracy and signal-to-noise.

Figure 5A:
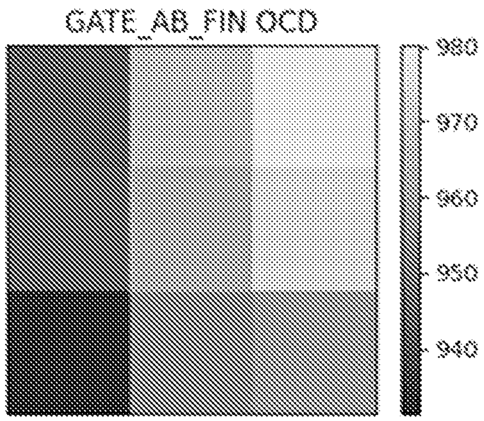
FIG. 5A exemplifies the sample's parameter values extracted from the OCD data measured data for an array/matrix of the measured spots.
Figure 5B:
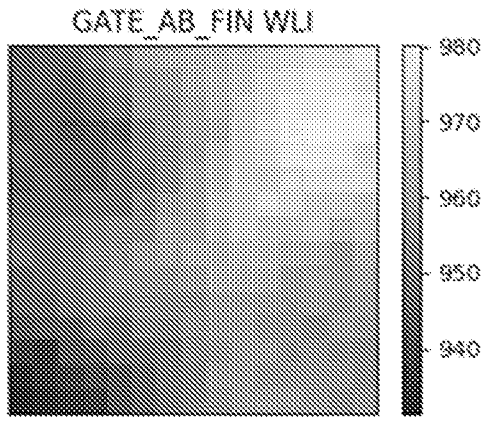
FIG. 5B exemplifies the distribution (map) of pixel-related values of the same parameter within each of the measured spots, as extracted from combined OCD and WLI measurements.

Reference is made to FIGS. 5A and 5B where FIG. 5A exemplifies the parameter values extracted from the OCD measured data for the matrix of measured/illuminated spots, and FIG. 5B exemplifies the resulting map of the parameter change (parameter value's distribution) within each pixel in the pixel matrix of the spot size for each spot in the corresponding matrix of spots. In this specific not-limiting example, the pattern parameter being measured is GATE_AB_FIN.

It should be noted that the application may include many parameters ($\dim(\mathbb{P}_{OCD}) \sim 10$), all changing across the sample (wafer) and die-to-die or wafer-to-wafer (W2W) and using the combined OCD and WLI measurements and the above-described data processing, measurement of each of the selected parameters can be optimized. The result of the optimization of the Gate Height parameter is shown in FIG. 3B and proves that the match WLI-OCD is very good.

Thus, combining the standard OCD measurement for an average across-pad/spot application solution with the WLI technique provides the WLI optimization a much better starting point, allowing even for the low SNR signal to solve the POI (point-of-interest) variations across the pad. Within pad, the demand for "out of spot contamination" is lower, and the lateral resolution becomes ~7μ.

We claim:

1. A control system for use in optical measurements on patterned samples, the control system comprising a computer system configured for data communication with a measured data provider, wherein the computer system comprises a data processor configured and operable to:

receive and process raw measured data of first and second types concurrently collected from the patterned sample being measured, said first and second types of the measured data comprising, respectively, scatterometry measured data and interferometric measured data, the scatterometry measured data having a signal-to-noise ratio that exceeds a signal-to-noise ratio of the interferometric measured data; wherein the interferometric measured data has a spatial resolution that exceeds a spatial resolution of the scatterometry measured data; wherein the data processor being configured to process the measured data to determine pattern parameters along said patterned sample characterized by said first signal to-noise and said second spatial resolution; and wherein the data processor comprises:

a data processing utility configured and operable to process the scatterometry measured data utilizing at least one of model-based or machine learning processing of said scatterometry measured data and extract an average value of at least one pattern parameter of the sample for each measured spot on the sample;

an optimizer utility configured and operable to process the interferometric measured data to transform each pixel-related interferogram of the interferometric measured data into a pixel-related spectrum, and utilize the scatterometry measured data to extract, from said each pixel-related spectrum, a spectral part matching the scatterometry data, and generate respective first and second matching spectra; and a spectral analyzer utility configured and operable to analyze the first and second matching spectra and extract, from a spectral difference between the first and second matching spectra, distribution of pixel-related measured values of said at least one parameter in a pixel matrix of a size of the measured spot, and generate output data indicative of said distribution.

2. The control system according to claim 1, wherein said output data is in the form of a map of the parameter's values for each of said at least one parameter.

3. A system for measuring parameters of patterned samples comprising:

a measurement system configured to concurrently perform scatterometric measurements and spectral interferometric measurements on each measured spot on the sample, the measurement system comprising: a broadband light source generating light propagating along an illumination channel towards the measured spot, an interferometric assembly, a detection system comprising a spectrometer and a pixelated detector generating, respectively, first type measured data and second type measured data concurrently collected from the measured spot on the sample, being scatterometry measured data and interferometric measured data; and a control system for use in optical measurements on patterned samples, the control system comprising a computer system configured for data communication with a measured data provider, wherein the computer system comprises a data processor configured and operable to:

receive and process the scatterometry measured data and the interferometric measured data, the scatterometry measured data having a signal-to-noise ratio that exceeds a signal-to-noise ratio of the interferometric measured data; wherein the interferometric measured data has a spatial resolution that exceeds a spatial resolution of the scatterometry measured data; wherein the data processor being configured to process the measured data to determine pattern parameters along said patterned sample characterized by said first signal to-noise and said second spatial resolution; and wherein the data processor comprises:

a data processing utility configured and operable to process the scatterometry measured data utilizing at least one of model-based or machine learning processing of said scatterometry measured data and extract an average value of at least one pattern parameter of the sample for each measured spot on the sample;

an optimizer utility configured and operable to process the interferometric measured data to transform each pixel-related interferogram of the interferometric measured data into a pixel-related spectrum, and utilize the scatterometry measured data to extract, from said each pixel-related spectrum, a spectral part matching the scatterometry data, and generate respective first and second matching spectra; and a spectral analyzer utility configured and operable to analyze the first and second matching spectra and extract, from a spectral difference between the first and second matching spectra, distribution of pixel-related measured values of said at least one parameter in a pixel matrix of a size of the measured spot, and generate output data indicative of said distribution.

4. The system according to claim 3, configured and operable to selectively activate the interferometric assembly to collect said second type measured data and disactivate the interferometric assembly to collect the scatterometric measured data.

5. A data analysis method for use in optical measurements on patterned samples to determine at least one pattern parameter of interest, the method comprising:

providing raw measured data of first and second types concurrently collected from the patterned sample being measured, said first and second types of the measured data comprising, respectively, scatterometry measured data characterized by first relatively high signal-to-noise and first relatively low spatial resolution, and interferometric measured data characterized by second relatively low signal-to-noise and second relatively high spatial resolution, and processing said first and second types of the measured data to determine each of said at least one parameter of interest with said first signal to-noise and said second spatial resolution;

wherein the processing comprises:

applying at least one of model-based and machine learning processing to the scatterometry measured data to extract an average value of at least one pattern parameter of the sample for each measured spot on the sample;

processing the interferometric measured data to transform each pixel-related interferogram of the interferometric measured data into a pixel-related spectrum, utilizing the scatterometry measured data to extract, from said each pixel-related spectrum, a spectral part matching the scatterometry data, and generating respective first and second matching spectra; and analyzing the first and second matching spectra and extracting from a spectral difference between the first and second matching spectra, distribution of pixel-related measured values of said at least one parameter in a pixel matrix of a size of the measured spot and generating output data indicative of said distribution.

6. The data analysis method of claim 5, wherein said output data is in the form of a map of the parameter's values for each of said at least one parameter.

7. The data analysis method of claim 5, wherein the interferometric measured data is White Light Interferometry measured data and wherein the scatterometry measured data is Optical Critical Dimension metrology measured data.

8. The control system according to claim 1, wherein the interferometric measured data is White Light Interferometry measured data and wherein the scatterometry measured data is Optical Critical Dimension metrology measured data.

9. The system of claim 3, wherein said output data is in the form of a map of the parameter's values for each of said at least one parameter.

10. The system of claim 3, wherein the interferometric measured data is White Light Interferometry measured data and wherein the scatterometry measured data is Optical Critical Dimension metrology measured data.

* * * * *